W. B. PLESS.
DREDGING MACHINE.
No. 11,476. Reissued Mar. 5, 1895.
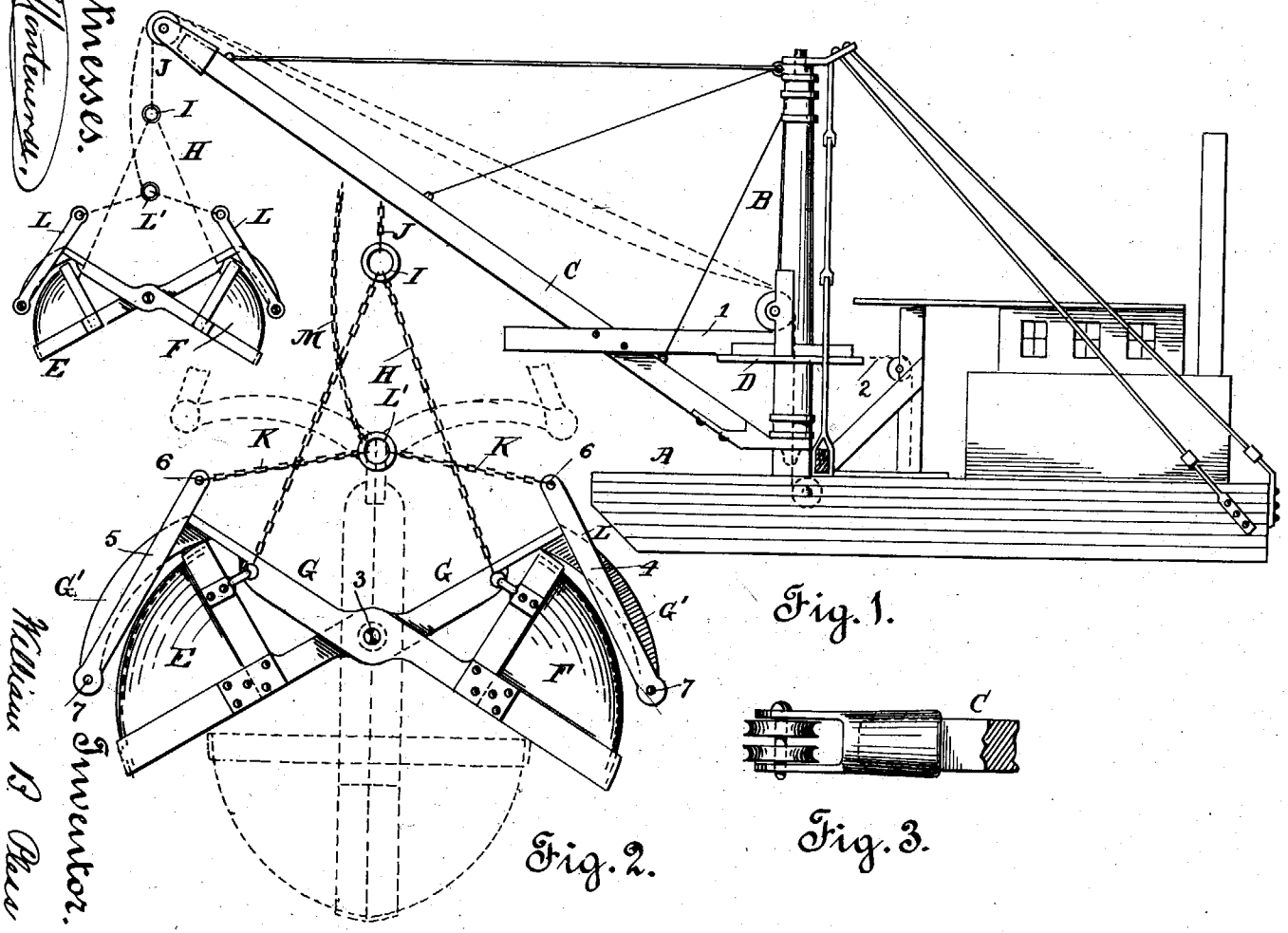
Witnesses.
F. Allentenerde.
M. R. Bryan
Inventor.
William B. Pless
by Spear & Seely
Attorneys

UNITED STATES PATENT OFFICE.

WILLIAM B. PLESS, OF SAN FRANCISCO, CALIFORNIA, ASSIGNOR TO THE PLESS DREDGING AND RECLAMATION COMPANY, OF NEVADA.

DREDGING-MACHINE.

SPECIFICATION forming part of Reissued Letters Patent No. 11,476, dated March 5, 1895.

Original No. 502,934, dated August 8, 1893. Application for reissue filed September 14, 1894. Serial No. 523,048.

*To all whom it may concern:*

Be it known that I, WILLIAM B. PLESS, a citizen of the United States, residing at San Francisco, in the county of San Francisco and State of California, have invented certain new and useful Improvements in Dredging-Machines; and I do hereby declare that the following is a full, clear, and exact description thereof.

This invention relates to dredging machines, and more especially to that class of dredgers in which a bucket composed of two sections hinged together, is suspended from a swinging boom or derrick, and connected to suitable hoisting mechanism carried by a floating hull or scow.

In Letters Patent No. 426,681, granted to me April 29, 1890, I described and showed a dredging apparatus of the type above referred to; and my present invention consists in certain improvements upon the construction of the bucket shown in that patent and upon the means for hoisting, lowering, opening, and closing the hinged sections or jaws of the bucket. The mechanism for supporting the boom and for swinging it to discharge the bucket is preferably like that shown in the said patent, but forms no essential part of the present invention which will be fully understood by reference to the following detailed description, and to the accompanying drawings, in which—

Figure 1, is a side elevation of the whole dredging apparatus. Fig. 2, is an elevation of the bucket with the jaws opened. Fig. 3, is a detail view of the end of the boom showing the cap and sheaves for the passage of the hoisting chains.

A represents the hull of the dredger having a deck house to contain the boilers, engine and winding machinery. B is a hollow rotary mast, stepped in the hull, and having secured near its lower end the foot of the projecting boom C. D is a turn-table secured to the mast, and connected to the boom by jaws 1, as in my former patent, or by chains if preferred. The turn table is connected to the winding machinery by a chain 2. All these parts are substantially as shown in my former patent, and are of the construction I prefer to use, but form no part of my present invention. They are shown in the drawings however, in order to give a general idea of the relative positions and operations of the boom mast and winding mechanism.

The dredge bucket is illustrated in detail in Fig. 2. It consists of two sections E and F, preferably of heavy boiler iron, each, in side elevation being approximately in the shape of a quadrant of a circle. To each end of each section is firmly bolted a heavy arm G, each pair of such arms being pivoted together by a transverse pin 3.

In my patent before referred to, I described and showed means for suspending and operating the hinged sectional bucket upon which my present construction is a marked improvement. In that case I attached to the arms G on each side of the bucket, a pair of levers, from the ends of which a chain extended to and was suspended from a sheave block between the boom and bucket. In like manner the bucket sections were suspended from a second sheave block by a chain, one end of which was connected to each section. Each sheave block was then suspended by an independent chain fixed to the extreme end of the boom, then passing, first, around its appropriate block, then back to a pulley on the boom, and thence to the mast and winding gear. These devices have proved to be unnecessarily complicated; and though I obtained such a purchase as to give a power much in excess of that required, the hoisting movements were extremely slow and the working capacity of the machine was not more than fifty per cent. of that of a dredge constructed according to my present invention. There are other disadvantages of the sheave-block system of suspension which I shall explain in connection with the detailed description of my present improvements.

Referring to Fig. 2 it will be seen that four chains H are secured to the corners of the bucket sections and extend to a simple ring I upon which they can move freely. From this ring a single chain J passes over a sheave at the extremity of the boom and thence to the mast and winding mechanism The chains K by which the closing and hoisting of the bucket sections are controlled, are secured to links L, each composed of two bars 4, 4, or 5, 5, secured together by pins 6, 7, to one of which the chain is connected and by the other of which the links are pivoted to the outwardly bent extensions G′ on the arms G. The chains K are then connected to a ring L′, from which the single suspension chain M extends over a sheave at the extremity of the boom and thence to the mast and winding machinery. It might be possible to connect the chains K directly to the arms G; but for several reasons the links are preferable. In the first place, the chains are centered on the transverse pins of the links and hence there is no side strain as there would be if they were attached to the arms G, at the side, as would be necessary. In the second place, as shown by Fig. 2, if the chains were attached directly to the ends of the levers they would interfere with the action of the arms and bucket by chafing and friction. By using the links, the chains work entirely free, without obstruction. When so folded on the arm the apparatus is compact and the short cross chains K are held free from entanglement, by reason of their connection with the ring. As the buckets close, the links unfold and extend the connections between the arms and ring and this improves the leverage in the closing of the bucket. It will be seen that by these improvements all sheave blocks and tackle of that character are entirely done away with, and that the pull from the hoisting machinery to the bucket is direct. Furthermore the hoisting chains are self-adjusting in the supporting ring, so that if by chance one side of the bucket should not enter the soil, the chain on one side will slacken and thus relieve the strain which would probably ensue if a device which creates such friction as a sheave block were used for supporting the chains. As in this case both chains pass over the boom at its extremity, and at that point only, I am able to use the construction shown in Fig. 3, which would be impractical with the device shown in my former patent. In that patent I showed both hoisting chains passing through a hole and over sheave in the wooden boom. My present improvement consists in a hollow cap and sleeve mounted upon the extreme end of the boom, which is formed into a bearing for it. This cap, which is a single steel casting, contains the sheaves over which the hoisting ropes pass; and being loose on the end of the boom, although held in place by the weight of the bucket, will remain in place and keep the sheaves in line in case the boom itself should become twisted from any cause. The cast cap moreover prevents all the wear to which the wooden boom is subjected by the old construction.

In operating the bucket and supposing the parts to be in the position shown in Figs. 1 and 2, I assume that it has been dropped upon the bottom ready to take its load, and that the sections are open. The first pull is upon the chain M, which causes the sections to close and take the load. The strain is continued upon this chain M, which now becomes a hoisting chain, the bucket being closed and the parts being in the position shown by dotted lines in Fig. 2. When the bucket has been hoisted above the surface of the water, or in any case, to the proper point of elevation, the boom is swung around, carrying the bucket to a position just above the point where it is desired to discharge the contents. At that time the operator in control of the winding machinery relaxes the chain M, and winds up the chain J; and this latter strain operating through the chains H, opens the bucket and dumps the load. The boom is then swung back to the point where the dredging is being done, and the open bucket is once more in position to be lowered upon the bottom to receive another load.

What I claim is—

1. In combination with the hull of a dredger and with winding machinery, a swinging boom having guide sheaves at or near its extremity, a bucket composed of two sections pivoted together, outwardly extending angular lever arms secured to said bucket sections, a hoisting chain connected to a ring and thence by connections to the extensions of the lever arms, and a dumping chain connected to a ring and thence by chains to the bucket sections, said hoisting and dumping chains passing over the sheaves at the boom end and thence to the winding machinery, substantially as described.

2. In combination with the boom of a dredge having sheaves for hoisting and dumping chains, a dredge bucket composed of two sections each having an arm G with outwardly bent extensions G′, links L pivoted to the outer ends of these extensions, and connected at their upper ends by a ring to a chain M, a chain J connected by chains H to the corners of the bucket sections, the chains J and M being arranged on the boom sheaves, all substantially as described.

3. In combination with the bucket sections, an arm G, fixed to each side of each section, and having an outwardly bent extension, a link composed of two bars pivoted on the outer end of each extension and connected at its upper end by a chain to a ring, and a chain M, connected to said ring, all substantially as described.

4. In a dredging machine, a swinging boom, in combination with a loose sleeve and cap at its extremity, a suspended bucket, and hoisting chains from said bucket passing over sheaves journaled in said cap, substantially as set forth.

In testimony whereof I affix my signature, in presence of two witnesses, this 22d day of June, 1894.

WILLIAM B. PLESS.

Witnesses:
M. R. BRYAN,
L. W. SEELY.